United States Patent
Betts et al.

(10) Patent No.: US 7,937,716 B2
(45) Date of Patent: May 3, 2011

(54) MANAGING COLLECTIONS OF APPLIANCES

(75) Inventors: Ryan Betts, Framingham, MA (US); Robert David Callaway, Holly Springs, NC (US); John Smith Graham, Raleigh, NC (US); Charles Marcel Kinard, Cary, NC (US); Holger Reinhardt, Esslingen (DE); Adolfo Francisco Rodriguez, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/850,052

(22) Filed: Sep. 5, 2007

(65) Prior Publication Data
US 2009/0064192 A1    Mar. 5, 2009

(51) Int. Cl.
*G06F 3/00*   (2006.01)
*G06F 15/173*   (2006.01)

(52) U.S. Cl. .................................. 719/320; 709/223

(58) Field of Classification Search .................. 719/320; 709/223
See application file for complete search history.

(56) References Cited

U.S. PATENT DOCUMENTS 6,757,723 B1    6/2004   O'Toole et al.
7,139,817 B1    11/2006  English et al.

OTHER PUBLICATIONS

Kevin Workman, Designing an Optimized Enterprise Windows NT/95/98 Client Backup Solution With Intellegent Data Management, Aug. 5-8, 1998.*

Rodriguez et al., "IBM WebShere DataPower SOA Appliances Part 1: Overview and Getting Started", Red Paper, ibm.com/redbooks, Apr. 2008.
IBM WebSphere DataPower Integration Appliance X150-Features and benefits; 306.ibm.com/software/integration/datapower/xi50/features/; Aug. 11, 2008.
IBM WebSphere DataPower XML Security Gateway XS40-Features and benefits; 306.ibm.com/software/integration/datapower/xs40/features/; Aug. 11, 2008.
IBM WebSphere DataPower XML Accelerator XA35-Features and benefits; 306.ibm.com/softward/integration/datapower/xa35/features/; Aug. 11, 2008.

* cited by examiner

*Primary Examiner* — Lechi Truong

(57) ABSTRACT

A protocol to enable management of opaque entities in a computing environment comprises an events component and a commands component. The events component enables a manager to utilize a received event communicated by a corresponding managed entity to indicate when administration or other management actions have occurred to domain information on the corresponding managed entity. The commands component interacts with the managed entities in response to the events component receiving corresponding events there from. The commands component further comprises commands for backing up the domain information stored by the managed entities as opaque configuration objects, for restoring the domain information to the managed entities as opaque configuration objects and for querying an identified one of the plurality of managed entities to determine whether two domain configurations are semantically different in a way that allows the configuration to remain opaque to the manager.

18 Claims, 12 Drawing Sheets

MANAGING COLLECTIONS OF APPLIANCES

CROSS REFERENCE TO RELATED APPLICATIONS

The present application is related to U.S. patent application Ser. No. 11/850,046, entitled "Managing Collections Of Appliances", which is filed currently herewith and hereby incorporated by reference.

BACKGROUND OF THE INVENTION

The present invention relates to systems, computer-implemented methods and computer program products for managing collections of entities such as appliances.

Appliances built purposely for performing traditional middleware service oriented architecture (SOA) functions are becoming more prevalent in certain computer environments. For example, SOA middleware appliances may simplify, help secure or accelerate XML and Web services deployments while extending an existing SOA infrastructure across an enterprise. The move toward middleware appliances that are built purposefully for SOA functions is predicated, at least in part, by the observation that conventional software solutions have increased processing requirements of SOA-based payloads despite the broad functional platforms, flexibility and customization available in conventional software solutions.

The utilization of middleware-purposed hardware and lightweight middleware stacks can address the performance burden experienced by conventional software solutions. In addition, the appliance form-factor can provide a secure, consumable packaging for implementing middleware SOA functions. However, the gains achieved by conventional middleware appliances provide a management burden of a new node in the enterprise because each SOA middleware appliance is configured individually and independent of the rest of the middleware infrastructure.

BRIEF SUMMARY OF THE INVENTION

According to various aspects of the present invention, a protocol to enable management of opaque entities in a computing environment comprises an events component and a commands component. The events component is configured, when executed, to enable a manager to utilize a received event communicated by a corresponding managed entity of a plurality of managed entities to indicate when administration or other management actions have occurred to domain information on the corresponding managed entity. The commands component is configured, when executed, to interact with select ones of the plurality of managed entities in response to the events component receiving corresponding events there from so that the manager can manage the plurality of managed entities as opaque entities.

The commands component further comprises commands for backing up the domain information stored by the managed entities as opaque configuration objects, for restoring the domain information to the managed entities as opaque configuration objects and for querying an identified one of the plurality of managed entities to determine whether two domain configurations are semantically different in a way that allows the configurations to remain opaque to the manager.

DETAILED DESCRIPTION OF THE INVENTION

According to various aspects of the present invention, an appliance manager is provided, which is capable of managing multiple appliance types by treating configuration data of the managed appliances as opaque objects, e.g., by containing appliance configuration data as binary large objects (blobs). Accordingly, the appliance manager is not required to understand the appliance configuration and/or service data of its managed appliances and may thus be considered appliance agnostic.

According to further aspects of the present invention, the appliance manager exchanges configuration data with managed appliances in response to receiving events where a received event indicates that an action, such as a change in configuration data has occurred on an identified managed appliance. In this regard, the appliance manager may provide configuration data as an opaque object which may be imported and loaded into the identified managed appliance. Alternatively, the appliance manager may obtain configuration data from the identified managed appliance, which it treats as an opaque object that is stored and optionally distributed to one or more other managed appliances.

According to still further aspects of the present invention, an appliance management protocol provides tools for managing appliances, such as by enabling an appliance agnostic management device to communicate with opaque entities such as middleware appliances. The appliance management protocol allows a manager to manage service-level configurations by providing a set of common commands that interact with entity domains, such as by providing commands to exchange service-independent device settings, to query managed appliances, to backup and restore appliance configurations of managed appliances, and to perform other management capabilities as described in greater detail herein.

For purposes of illustration, an appliance manager and an exemplary implementation of a management protocol will be described in terms of managing middleware appliances in a service oriented architecture (SOA) environment. However, various aspects of the present invention may be expanded across entities such as appliances of all types and is not limited Lo middleware appliances or appliances deployed in service oriented architecture environments.

Figure 1:
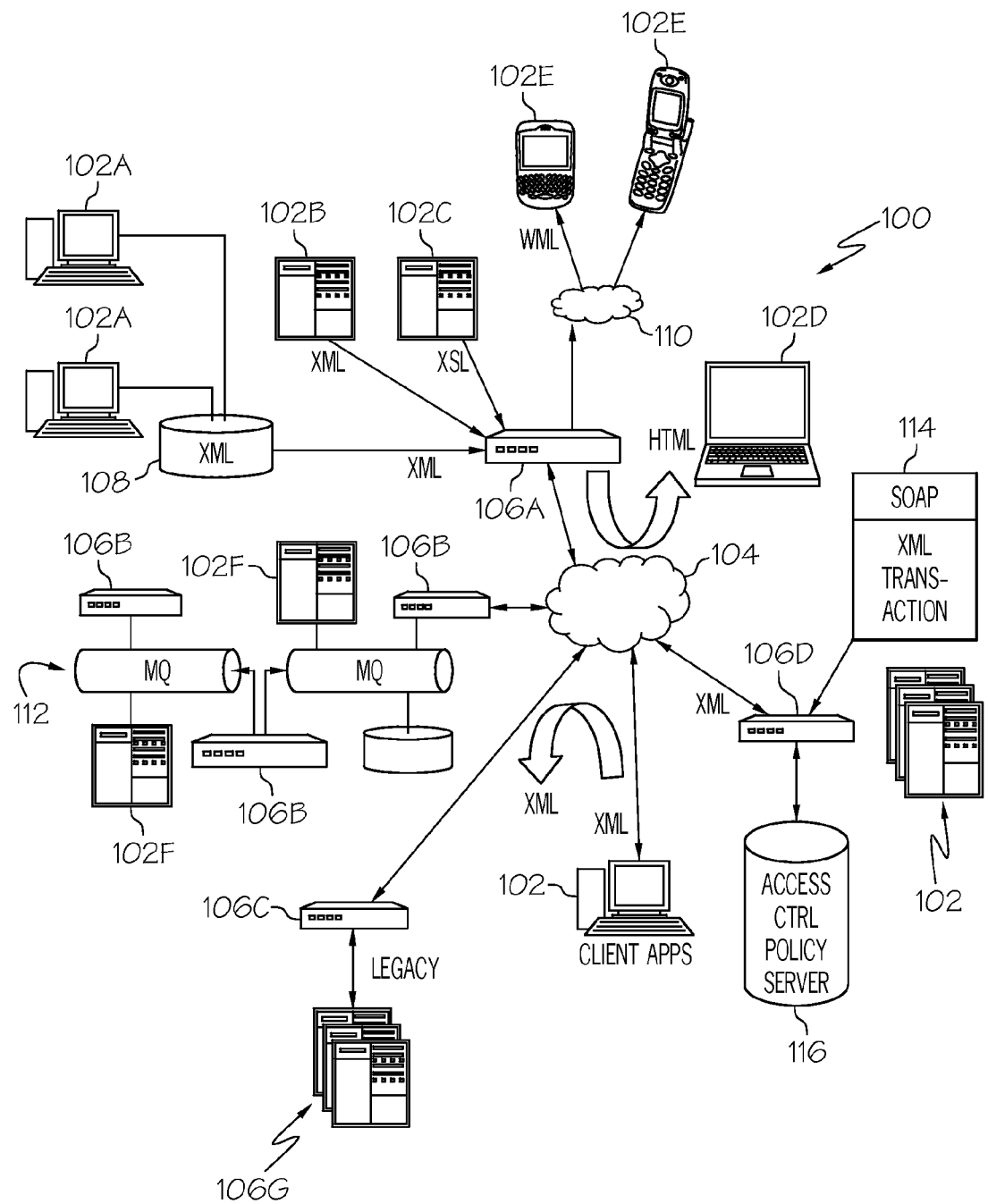
FIG. 1 is a schematic illustration of an exemplary system according to various aspects of the present invention.

Referring now to the drawings and particularly to FIG. 1, a general diagram of an enterprise 100 is illustrated. The enterprise 100 comprises a plurality hardware and/or software processing devices, designated in general by the reference numeral 102, that are linked together by a network 104. Typical processing devices 102 may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information.

The network 104 provides communications links between the various processing devices 102, and may be supported by networking components that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

The illustrated enterprise 100 also includes a plurality of appliances, which are designated in general, by the reference numeral 106. An appliance 106 typically comprises a combination of hardware and resident firmware that may be purpose driven to address a need in a computing environment. In general, appliances 106 may be used, for example, to assist in building an architecture that is easy to scale and manage, such as by making application integration a network function, by providing transport-independent transformation, routing, and auditing, security, etc., some examples of which are described below.

For purposes of illustration, the various appliances 106 shown in FIG. 1 comprise middleware service oriented architecture appliances that address performance burdens exhibited by conventional service oriented architecture software solutions, e.g., which may otherwise be executed on one or more of the processing devices 102.

A first exemplary appliance 106A may comprise, for example, an accelerator device, such as a DataPower XA35 XML Accelerator by International Business Machines (IBM) Incorporated of Armonk, N.Y., USA. The accelerator appliance 106A is shown for exemplary purposes operating in an XML proxy mode of operation and is interconnected to a plurality of content and application generation processing devices 102A which generate, for example, extended markup language (XML) fragments via an XML database 108. Further, the accelerator appliance 106A may be connected to one or more web server(s) 102B, application server(s) 102C, devices 102D across the network 104, e.g., as schematically represented by the laptop computer, to wireless networks 110, which may communicate with wireless devices 102E such as cellular portable wireless processing devices including cell phones, personal data assistants and other wireless pervasive computing devices, etc.

The accelerator appliance 106A may be used, for example, to provide a middleware service oriented architecture appliance that simplifies, accelerates, and helps secure data movement and conversion by providing a device that can off-load corresponding tasks on server processing devices 102. In this regard, the accelerator appliance 106A may be utilized to deliver common message transformation, integration, and routing functions, such as by performing extended markup language (XML) transformations, XML compression and other essential XML processing, Extensible Stylesheet Language Transformations (XSLT) processing and other resource-intensive tasks.

As a further example, integration appliances 106B, such as a plurality of DataPower XI50 Integration Appliances by IBM, are illustrated as integrating with message and queueing (MQ) system 112 to interconnect and integrate various processing devices 102F which perform program-to-program communication using message queuing. The integration appliances 106B may transform data between disparate message formats, including binary, legacy, and XML, and may provide message routing and security, MQ/HTTP/FTP connectivity, and transport mediation.

Another exemplary integration appliance, 106C is illustrated as coupling legacy computing devices 102G to the network 104, e.g., to transform XML communications received from client applications across the network 104 into appropriately formatted messages for the legacy devices. Additionally, the integration appliance 106C may transform legacy communications to XML (or other suitable format) for communication across the network 104.

Still further, yet another exemplary appliance 106D, such as a DataPower XML Security Gateway XS40 by IBM may provide protection against XML vulnerabilities by acting as an XML proxy and by performing XML well-formedness checks, buffer overrun checks, XML schema validation, XML filtering, XML Encryption and Digital Signature, content-based routing, XML denial of service protection and other appropriate forms of network security. For example, the security appliance 106D may interrogate individual SOAP/XML transactions 114 and determine whether it should be allowed based on payload contents, security policy, identity information or other relevant factors. In this regard, the security appliance 106D may access a variety of policy enforcement points and central policy repositories, e.g., the access control policy server 116, etc.

In a typical enterprise system, a user such as a network manager perceives deployed appliances 106 as management islands, where each appliance 106 must be configured individually and independent of the rest of the middleware infrastructure, e.g., using a native web-based graphic user interface (WebGUI) or command line interface to configure an associated appliance 106. The user is further responsible for appliance maintenance, such as to manually retrieve, backup, and archive configurafion. Moreover, when more than one appliance 106 is to be used, e.g., to address scaling and redundancy built into the corresponding enterprise, the user must manually replicate configuration information across redundant appliances 106.

Figure 2:
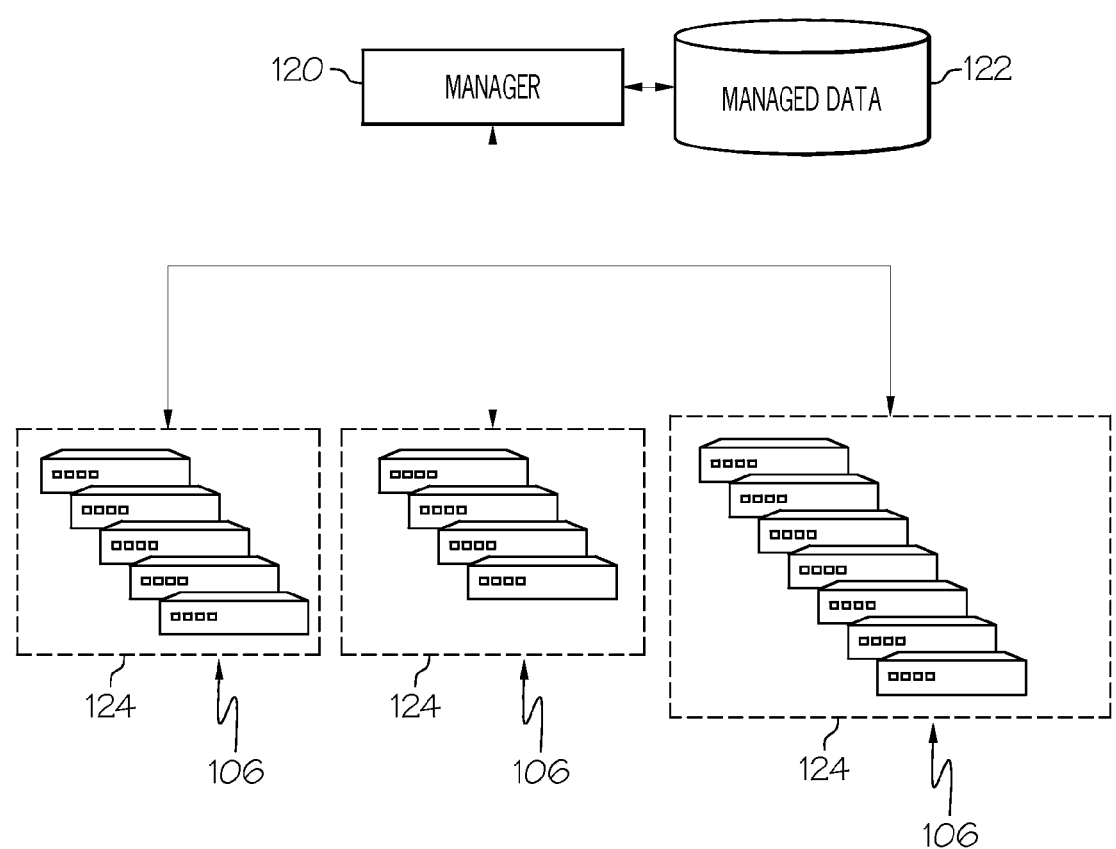
FIG. 2 is a block diagram of an appliance manager according to various aspects of the present invention.

Referring to FIG. 2, according to various aspects of the present invention, an appliance manager 120 is provided to manage the various appliances 106. The appliance manager 120 may provide any number of management functions, which may be directed for example, to avoid the need to configure each appliance individually and/or to backup, retrieve, archive, organize, version, synchronize, etc., appliance configurations as will be described in greater detail herein.

The appliance manager 120 interacts with a storage system 122, such as a database or other suitable storage capability to store appliance-related managed data so that the manager 120 can act as a repository to store necessary configuration information along with a corresponding timestamp or other relevant data, to perform versioning, and to perform clustering.

According to an aspect of the present invention, the appliance manager 120 is appliance agnostic and may thus be capable of managing multiple types of appliances 106 by treating configuration files of the managed appliances 106 as opaque objects, e.g., binary large objects (blobs), which may be zipped or otherwise compressed files, uncompressed binary files, etc. The appliance manager 120 sends/receives corresponding opaque objects to the associated appliance 106, which utilizes the opaque objects to perform a "difference" function, import configuration to the appliance 106, and export configuration from the appliance 106 as will be described in greater detail herein.

The implementation of an appliance agnostic manager reduces the complexity of the manager implementation because the appliance manager 120 does not need to understand the configuration and/or service data of a managed appliance 106. Under this arrangement, the manager 120 does not need to update its management platform, for example, if appliance configuration metadata changes, if new types of appliances 106 are added to the environment 100, etc.

As shown in FIG. 2, appliances 106 may be organized into configuration-identical device groupings which are referred to herein as managed sets 124. For example, each appliance 106 in a corresponding managed set 124 may have clone-able configuration settings that do not vary across each appliance 106 in its managed set 124. Each managed set includes an appliance 106 that is designated as the master appliance 106M, and zero or more appliances 106 that are designated as slave appliance 106S.

Figure 3:
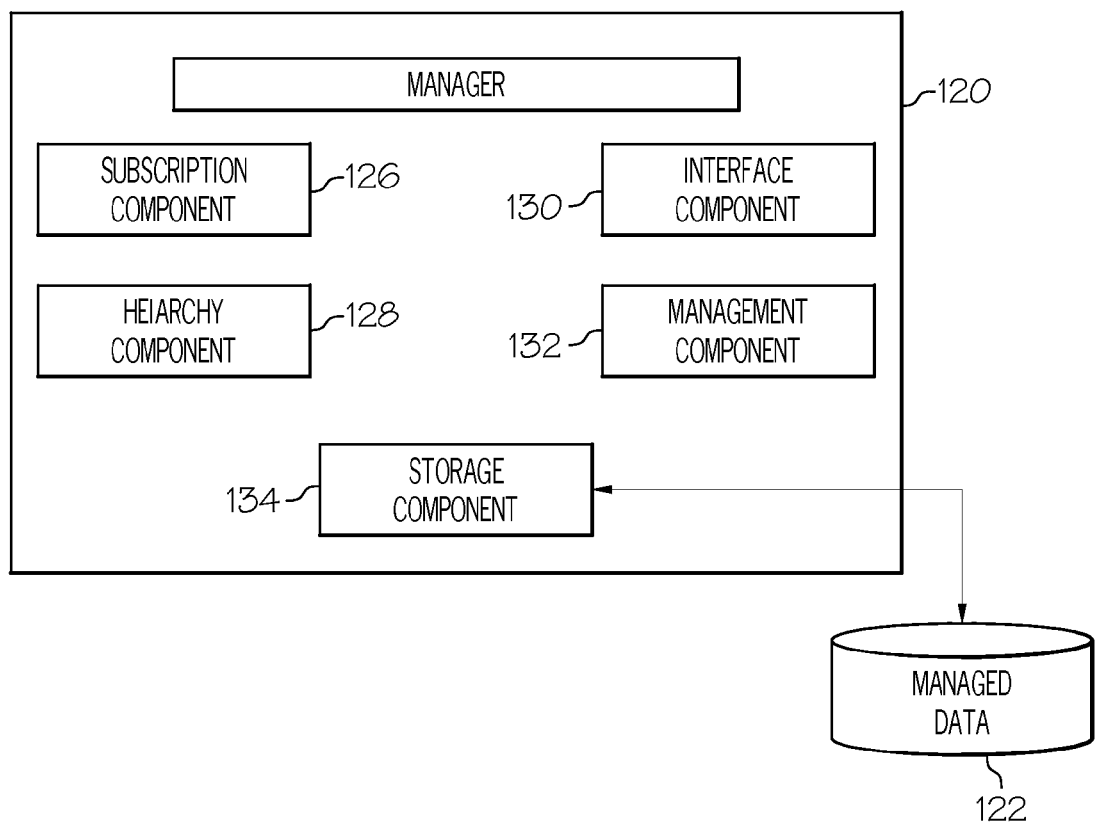
FIG. 3 is a block diagram of certain components of an appliance manager according to various aspects of the present invention.

Referring to FIG. 3, an appliance manager 120 according to various aspects of the present invention comprises several components, such as a subscription component 126, a hierarchy component 128, an interface component 130, a management component 132 and a storage component 134. The subscription component 126 identifies appliances 106 that are to be managed. Such appliances 106 are also referred to herein as "subscribed-to" appliances. In this regard, a given appliance manager 120 may not manage all of the appliances 106 within an enterprise 100. Rather, there may be multiple appliance managers 120, each assigned to certain ones of the appliances 106 within the enterprise 100. As another example, a given appliance manager 120 may not be required to manage certain appliances 106, e.g., where those appliances are inactive, etc. Any suitable technique may be utilized to subscribe appliances 106 to a given appliance manager, such as by initiating an exchange of administrative information between an appliance manager 120 and corresponding managed appliances 106.

The hierarchy component 128 organizes subscribed-to appliances into at least one managed set 124 of configuration-identical devices, where each managed set 124 has a master appliance 106M and zero or more slave appliances 106S, such as described with reference to FIG. 2. Data characterizing the hierarchy of subscribed-to appliances 106 may be stored, for example, in the storage 122 associated with managed data.

The interface component 130 provides interaction between the appliance manager 120 and the various active subscribed-to appliances 106. For example, the interface component 130 may facilitate communications between the appliance manager 120 and its various subscribed-to appliances 106. The interface component 130 may also allow user interaction, e.g., to set up parameters associated with managing appliances 106, to identify appliances 106 to be managed etc.

According to an aspect of the present invention, the appliance manager 120 exchanges configuration data with the active subscribed-to appliances 106 in the form of high level opaque objects which are referred to herein as domains. Domain information may be archived, backed up, stored, versioned or otherwise maintained in the managed data in the storage system 122. Moreover, events are utilized to indicate when administration or other management actions have occurred on a subscribed-to appliance 106. The events may comprise data-less messages from appliances 106 to the appliance manager 120 to indicate that the appliance manager 120 should take action. The use of events to trigger interaction between the appliances 106 and the appliance manager 120 will be described in greater detail below.

The management component 132 is provided to handle the management functions implemented by the appliance manager 120. For example, the management component 132 may be utilized to control versioning, decide whether a subscribed-to appliance 106 in a corresponding managed set 124 should be updated and otherwise perform organizational, logical and decision making operations of the appliance manager 120. The storage component 132 is provided to interact with the storage system 122 for managing and maintaining managed data.

In practice, the functions of the disclosed components 126, 128, 130, 132 and 134 of the appliance manager 120 shown in FIG. 3 may be implemented using any suitable organization, logic and ordering. For example, the functions of the subscription component 126 and the functions of the hierarchy component 132 may be implemented in the management component 132, etc.

According to an aspect of the present invention, the appliance manager 120 from time to time receives events from select active subscribed-to appliances 106 and exchanges information with the select active subscribed-to appliances 106 in response to receiving the events. The management component 120 also dynamically manages the managed set(s) 124 of appliances 106, for example, in response to a service level configuration change in the managed appliances. The service level configuration data is part of a specific service domain, which may comprise, for example, service objects pertaining to a specific destination cluster or application, and is treated by the appliance manager as a high level opaque object.

Figure 4:
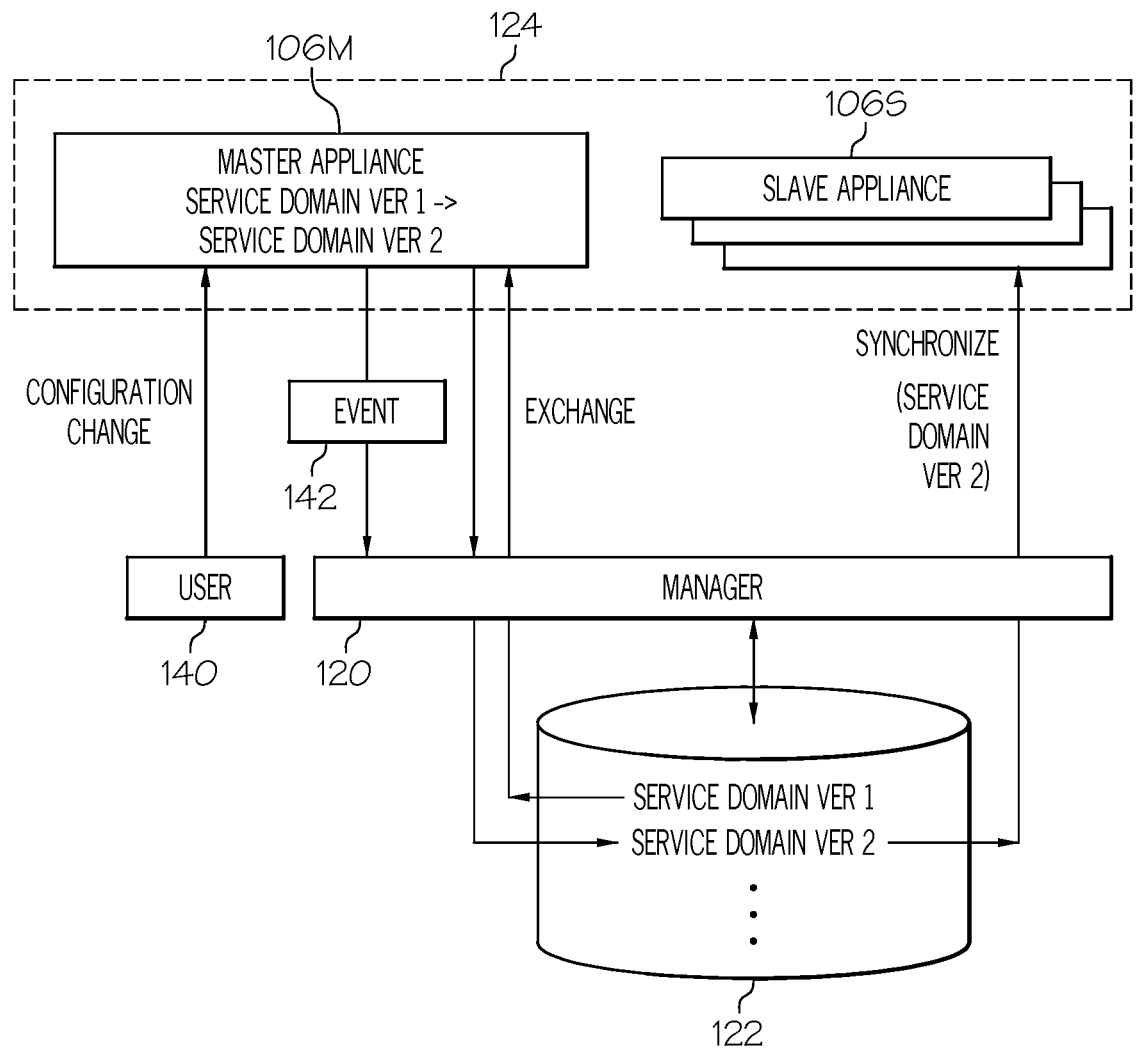
FIG. 4 is a schematic illustration of an information flow for managing appliances according to various aspects of the present invention.

Referring to FIG. 4, an interaction is illustrated between a master appliance 106M and an appliance manager 120 according to an aspect of the present invention. As shown, a user 140 such as a systems administrator, support person, autonomous computing process or other human or automated process may log into a master appliance 106M and make a service level configuration change, e.g., using a command line, web-based graphic user interface, etc. For example, as shown, SERVICE DOMAIN VER 1 has been changed to SERVICE DOMAIN VER 2. In response to the service level configuration change to SERVICE DOMAIN VER 2, the master appliance 106M generates an event 142 to the appliance manager 120 identifying that a change may have occurred in its configuration in response to interaction with the user 140.

The appliance manager 120 exchanges information with the master appliance 106M in response to receiving the event 142. For example, where the appliance manager 120 is performing version control, the appliance manager 120 may communicate the currently stored configuration file (service domain), e.g., as an opaque object (blob) to the master appliance 106M. For example, assume that the appliance manager 120 has stored SERVICE DOMAIN VER 1 as the current configuration for a given managed set 124 associated with the master appliance 106M. The master appliance 106M may compare the service domain received from the appliance manager 120 with its current configuration, e.g., compare SERVICE DOMAIN VER 1 with SERVICE DOMAIN VER 2. If interaction between the master appliance 106M and the user 140 resulted in no changes to the active service domain of the master appliance 106M, i.e., if SERVICE DOMAIN VER 1=SERVICE DOMAIN VER 2, the master appliance 106M responds to the appliance manager with a message that indicates that there are no changes. Under this arrangement, the appliance manager 120 may not be required to perform any further actions. For example, the user 140 may have logged into a configuration setting mechanism of the master appliance 106M and may have saved the current service level configuration without making changes, etc.

If the master appliance 106M determines that a change occurred so that the current active service domain of the master appliance 106M is different from the service domain communicated in the opaque blob from the appliance manager 120, i.e., SERVICE DOMAIN VER 1≠SERVICE DOMAIN VER 2, then the master appliance 106M may communicate a message to the appliance manager 120 indicating that a change occurred. The master appliance 106M may also communicate the new service domain information the appliance master 120, e.g., as a blob of information, e.g., the master appliance 106M may communicate SERVICE DOMAIN VER 2 to the appliance manager 120.

The appliance manager 120 may then update its managed data, such as by utilizing the storage component 134 to store the new service level configuration data in the storage system 122. Moreover, the appliance manager 120 may update each associated slave appliance 106S in the corresponding managed set 124 by communicating a blob to each slave appliance 106S that contains the new service domain information. For example, the appliance manager 120 may communicate a blob to each slave appliance 106S in the corresponding managed set 124 that includes SERVICE DOMAIN VER 2 so that all of the appliances 106 in the managed set 124 are synchronized.

Figure 5:
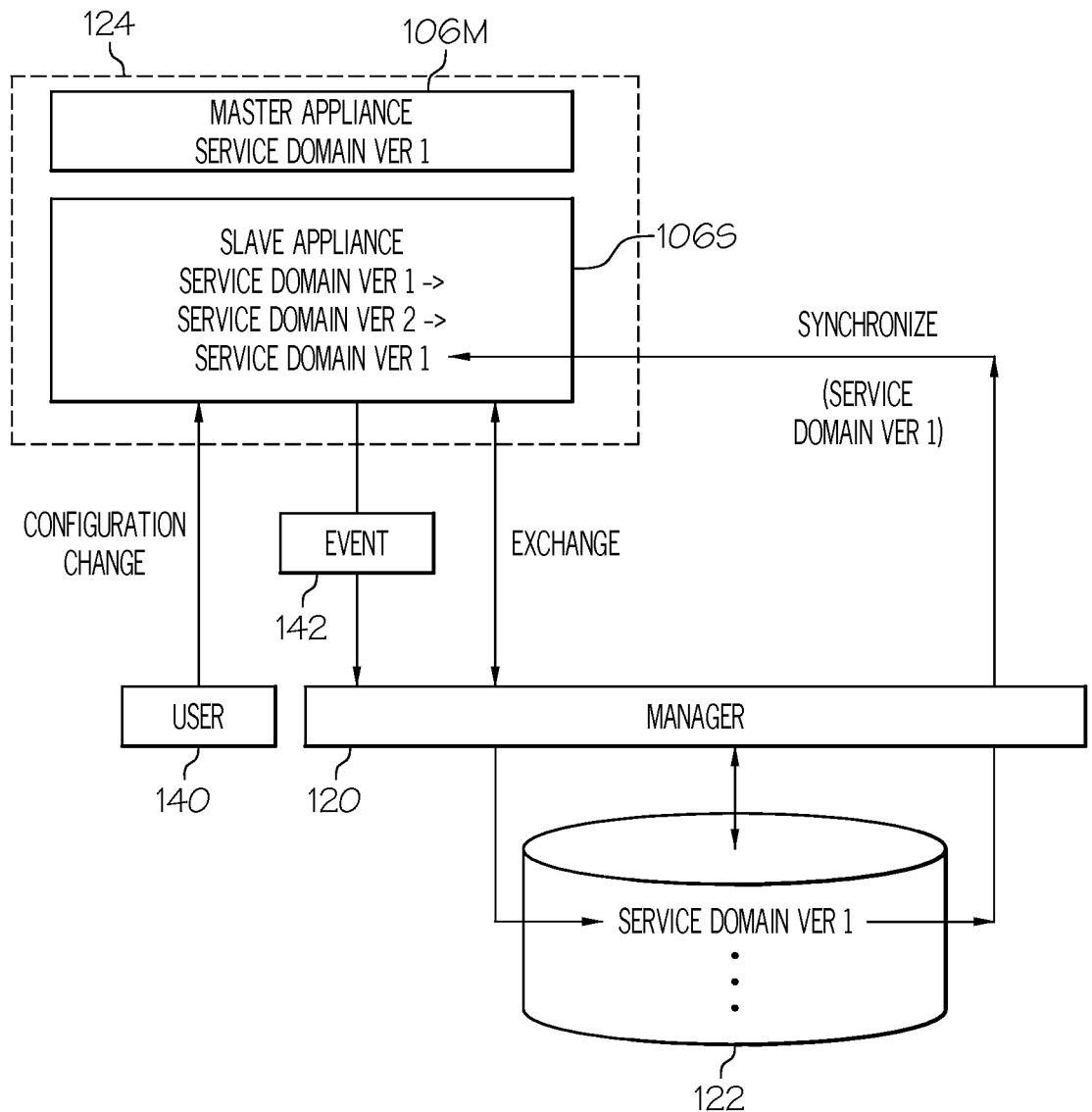
FIG. 5 is a schematic illustration of an information flow for managing appliances according to various aspects of the present invention.

Referring to FIG. 5, a user 140 may also log into a slave appliance 106S of a managed set 124 and make a service level configuration change to the service domain of the corresponding slave appliance 106S. According to an aspect of the present invention, the slave appliance 106S generates an event 142 which is communicated to the appliance manager 120 to indicate the occurrence of the service configuration change. The appliance manager 120 then exchanges information with the corresponding slave appliance 106S, such as by communicating the currently active configuration to the corresponding slave appliance 106S. For example, the appliance manager 120 may communicate SERVICE DOMAIN VER 1 to the slave appliance 106S in the example shown. The slave appliance 106S compares the service configuration received from the appliance manager 120 with its current configuration, e.g., as edited by a user 140. If the service configuration has not changed, i.e., SERVICE DOMAIN VER 2=SERVICE DOMAIN VER 1, a reply is sent from the slave appliance 106S back to the appliance manager 120 indicating that no further action is required.

As another example, if the configuration in the slave appliance 106S had changed, e.g., SERVICE DOMAIN VER 2, which was configured by the user 140, ≠SERVICE DOMAIN VER 1, the slave appliance 106S indicates to the appliance manager 120 that its configuration has changed. The slave appliance 106S may also communicate SERVICE DOMAIN VER 2 to the appliance manager. The appliance manager 120 then instructs the slave appliance 106S to utilize or otherwise revert back to SERVICE DOMAIN VER 1 as its current configuration so that all of the appliances 106 in the managed set 124 are synchronized to a common set of service domain configuration information. In this exemplary arrangement, all appliances 106 in the managed set 124 are synchronized to the master appliance 106M.

In the examples described with reference to FIGS. 4 and 5, the various appliances 106 in the managed set 124 are configured to generate an event 142 when a configuration activity has occurred thereon. Moreover, the appliances 106 are capable of comparing service domain information. For example, the appliances 106 may be able to compute or otherwise determine whether there is a difference between two service domain configurations using a difference function or other suitable process. Still further, the appliances 106 are capable of communicating their service domain information and for taking orders to reload service domain information. However, the appliances 106 in each managed set 124 may have no understanding as to whether they are a master, slave of whether they are even being managed.

Figure 6:
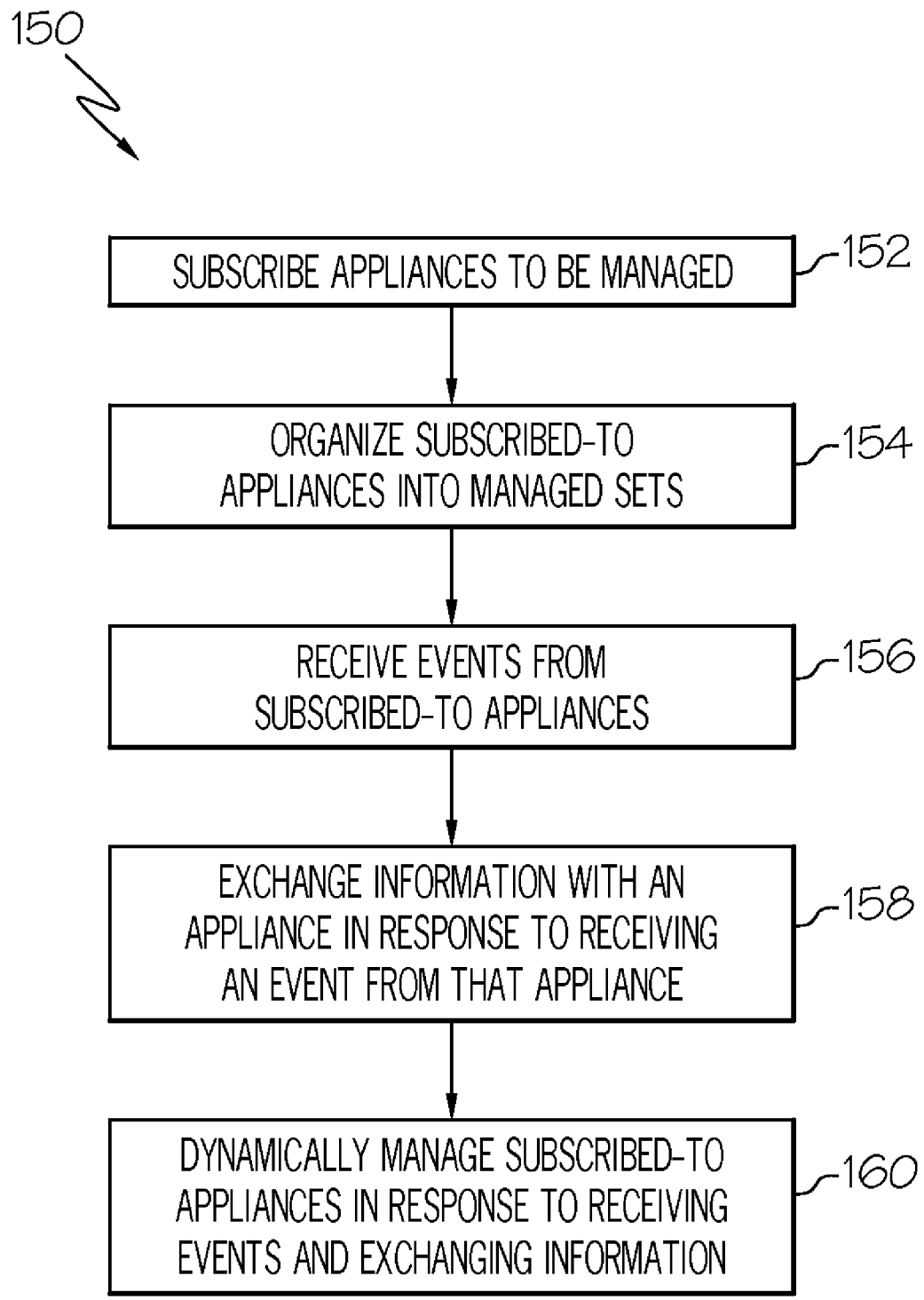
FIG. 6 is a flow chart illustrating a method for managing appliances according to various aspects of the present invention.

Referring to FIG. 6, a method 150 of managing appliances in a networked environment is illustrated. Appliances are subscribed to an appliance manager at 152 to identify active subscribed-to appliances to be managed. Subscribed-to appliances are organized into at least one managed set of configuration-identical devices, where each managed set has a master appliance and zero or more slave appliances at 154. Once configured, the appliance manager is ready to receive configuration-related events, such as from select active subscribed-to appliances at 156.

Upon receiving an event, information is exchanged between the appliance manager and a select active subscribed-to appliance associated with the event at 158 and the managed set(s) of appliances are dynamically managed at 160. For example, dynamic management of appliances may comprise updating slave appliances within a corresponding managed set if a configuration change is detected in the associated master appliance. Correspondingly, a slave appliance may be reverted back to the configuration domain version that is actively being utilized by its corresponding master appliance if a change is detected in the configuration of the slave appliance.

Figure 7:
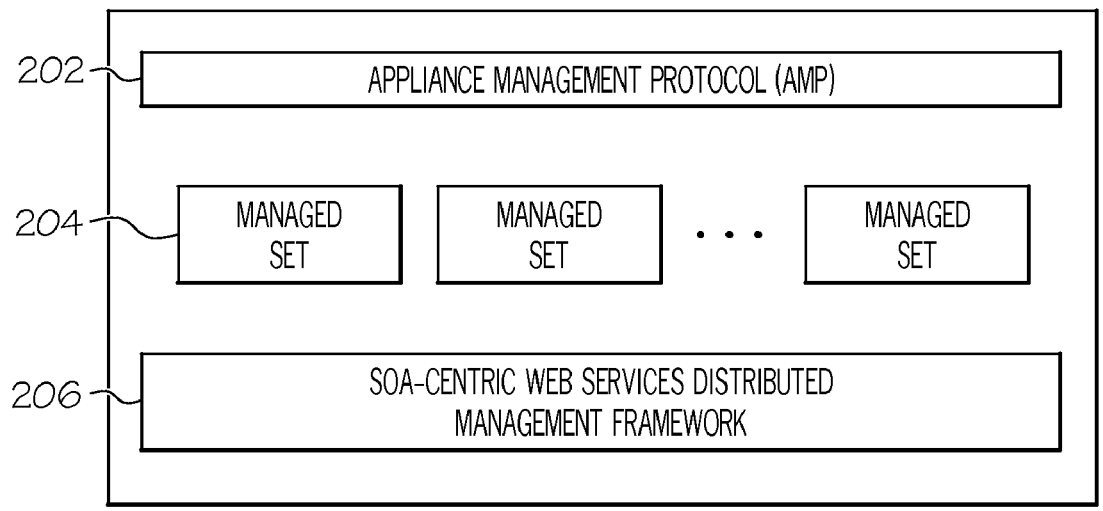
FIG. 7 is a block diagram of an appliance manager protocol according to various aspects of the present invention.

Referring to FIG. 7, according to an aspect of the present invention, an Appliance Management Protocol (AMP) 202 is provided, which allows for managing collections of managed sets 204. The appliance management protocol 202 may be utilized, for example, by the appliance manager 120 described with reference to FIGS. 2-6. In this regard, a managed set 204 may comprise, for example, a group of configuration-identical entities, e.g., the managed sets 124 described with reference to FIG. 2. Moreover, the Appliance Management Protocol 202 may be built atop of a suitable framework 206, such as a services oriented architecture-centric Web Services Distributed Management (WSDM) framework.

Figure 8:
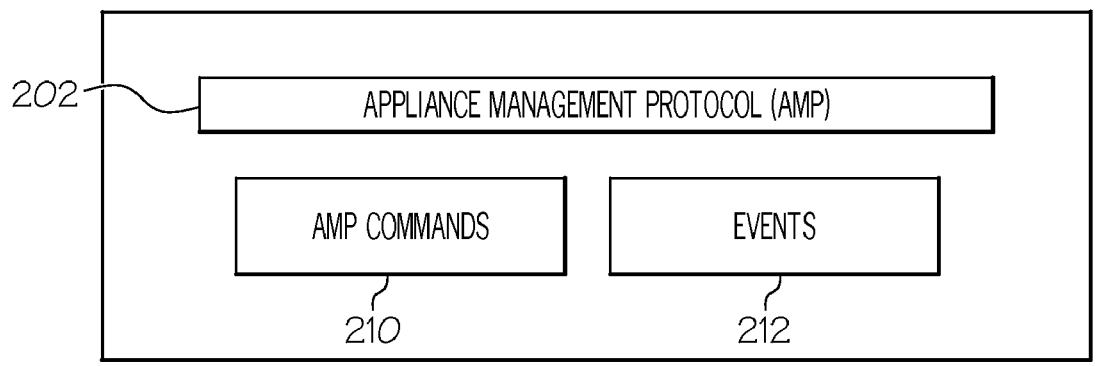
FIG. 8 is a block diagram of an appliance manager protocol that utilizes appliance commands and events to manage appliances.

Referring to FIG. 8, according to an aspect of the present invention, a management protocol system, i.e., the Appliance Management Protocol 202, may be implemented to manage opaque entities in a computing environment. In this regard, the Appliance Management Protocol 202 may comprise two components, including a commands component 210 and an events component 212. The events component 212 is configured such that when executed, a corresponding manager may utilize a received event communicated by a corresponding managed appliance to indicate when administration or other management actions have occurred to domain information on the corresponding managed appliance. The commands component 210 is configured such that when executed, command component commands interact with managed appliances in response to the events component receiving corresponding events from corresponding appliances in such a way that a corresponding manager can manage appliances as opaque entities.

For example, according to aspects of the present invention, the commands component 210 may allow a corresponding appliance manager to import and export service domain information as opaque high-level configuration objects, such as by enabling remote procedure call (RPC) style requests. As noted above, service-level configuration information that may be stored on an appliance 106 is part of a specific service domain, which could, for example, be service objects pertaining to a specific destination cluster or application. As such, the opaque domain is the fundamental unit of configuration supported by appliance management protocol commands. Another exemplary domain that may be utilized is referred to herein as the default domain, which contains configuration information that is common across a managed set 124 but not part of the service objects of the appliance 106, e.g., local domain name server (DNS) information.

The Appliance Management Protocol 202 further utilizes the events component 212 to make use of events that indicate when administration or other management actions have occurred on an appliance 106. Events are generated in response to actions taken with respect to a corresponding appliance, e.g., changes in a service level domain configuration, etc. and may be data-less, e.g., an indication that a change occurred without providing the content of the change. For example, an event may be issued to denote that a particular domain has been changed by a user. This stimulus drives the appliance manager 120 to perform the appropriate operations to version the change or replicate the new configuration to other appliances. Exemplary actions that trigger events are described in greater detail herein.

According to an aspect of the present invention, each appliance 106 in a corresponding managed set 124 is capable of performing comparisons of two different configuration files. For example, the appliances 106 may include a capability to compute a difference function between two configuration files. Based upon the comparison, the appliance 106 can respond to a corresponding appliance manager 120 with information regarding whether two files are the same or different. The use of events combined with the ability of appliances to themselves distinguish differences between configuration files allows the appliance manager 120 to automatically create and deploy versions while the data still remains opaque to the appliance manager 120. In this way, the Appliance Management Protocol 202 maintains the opaque management property by enforcing that all configuration changes are made through an appliance 106 using the standard configuration mechanisms provided by the appliances themselves. For example, as seen in FIGS. 4 and 5, a user 140 utilized a standard appliance configuration mechanism, e.g., a command line interface or web interface to make changes to the corresponding appliance 106.

For example, the management protocol may support an operation or operations to version changes to managed appliances by enabling a command that requests a copy of a current service level domain from a particular managed appliance in response to receiving an event there from indicating that a potential service level domain change has occurred. Commands may further be provided that retrieve a previously stored service level domain corresponding to the particular managed appliance, transmit the stored service level domain to the particular managed appliance and receive a message from the particular managed appliance indicating results of a comparison of the current service level domain and the stored service level domain. The manager may thus store version information including the copy of the current service level domain based upon results of the comparison indicated in the message received from the particular managed appliance.

Various aspects of the present invention provide a standard service oriented architecture-based way of performing opaque management of appliances 106. As such, the Appliance Management Protocol 202 may be enabled in products such as Tivoli and WebSphere, both by IBM through a componentized implementation, which is referred to herein as DataPower Management Interface (DeMI).

According to various aspects of the present invention, software management products may be used to dynamically manage collections of appliances to reduce the current increased management effort created by the inclusion of an appliance in a deployment. Beyond implementing the basic aspects of the Appliance Management Protocol 202 according to various aspects of the present invention, appliances 106 require no changes. In fact, appliances 106 may be completely unaware that they are part of a managed set altogether, whether as master or slave. This has the property that little firmware changes are required to appliances to enable them to be manageable by an appliance manager 120, e.g., implementing the appliance management protocol 202.

As noted above, appliance management protocol commands utilized by the commands component 210 of the Appliance Management Protocol 202 enable the appliance manager 120 to perform actions on appliances 106. For example, with a focus on the default domain, appliance management protocol commands may include functions to extract or import service-independent device settings from corresponding appliances 106. Using these commands, the appliance manager 120 can query the type of appliance 106 being managed, e.g., to ensure appliances 106 in an attempted managed set 120 are of the same type, e.g., that all appliances 106 assigned, e.g., by the hierarchy component, are configuration-identical devices.

Further, deployment-wide settings, such as DNS settings, can be exported from a master appliance 106M and imported into slave appliances 106S of a corresponding managed set keeping them synchronized. Another appliance management protocol command, such as a "set-firmware" command may be utilized to enable the appliance manager 120 to upgrade or downgrade appliance firmware levels. In addition, a "reboot" command allows management stations to reboot appliances.

In addition to commands in categories related to firmware, domain information and domain status, such as to set firmware, reboot, import/export domain information and query service-independent device settings, the appliance management protocol 202 may provide a number of commands specific to interacting with domains such as the service domain of associated appliances 106. In this regard, managed appliances 106 may support appliance management protocol commands (or similar commands) as well as appliance management protocol eventing. Alternatively, existing management frameworks may be converted to support the appliance management protocol 202.

Some exemplary commands that may be implemented by the appliance management protocol and a description of their function are set out below.

"Get domain list": This command returns the list of all service domains on a corresponding appliance.

"Get domain status": This command describes whether a domain is currently active.

"Get domain configuration" (backup of domain): This command returns an opaque blob representing a corresponding domain's configuration.

"Set domain configuration" (restore of domain): This command sets a domain configuration on a corresponding appliance using an opaque blob.

"Delete domain": This command removes a domain on a corresponding appliance.

"Start domain": This command enables an administrative domain on a corresponding appliance.

"Stop domain": This command disables an administrative domain on a corresponding appliance.

"Restart domain": This command stops and restarts a domain on a corresponding appliance.

:Domain difference configuration": This command determines whether two domains differ (including that which is currently running on an appliance).

The Domain Difference configuration command may be utilized, for example, to enable a corresponding appliance manager 120 to query whether two domain configurations are semantically different in a way that allows the configurations to remain opaque blobs to the appliance manager 120 as described in greater detail herein. Thus, the appliance manager 120 may attempt to store domain configurations on constituent appliances 106 of a managed set 124 and compare the result to ensure that the installed domain is what should be present, as set out in the examples with reference to FIGS. 4 and 5. This check and appropriate corrective actions is referred to herein as synchronizing a managed set 124. For example, an appliance manager 120 may synchronize a managed set 124 after an administrative operation or if it determines that some configuration has possibly been modified on a master or slave appliance 106 of a corresponding managed set 124 as discussed above.

Figure 9:
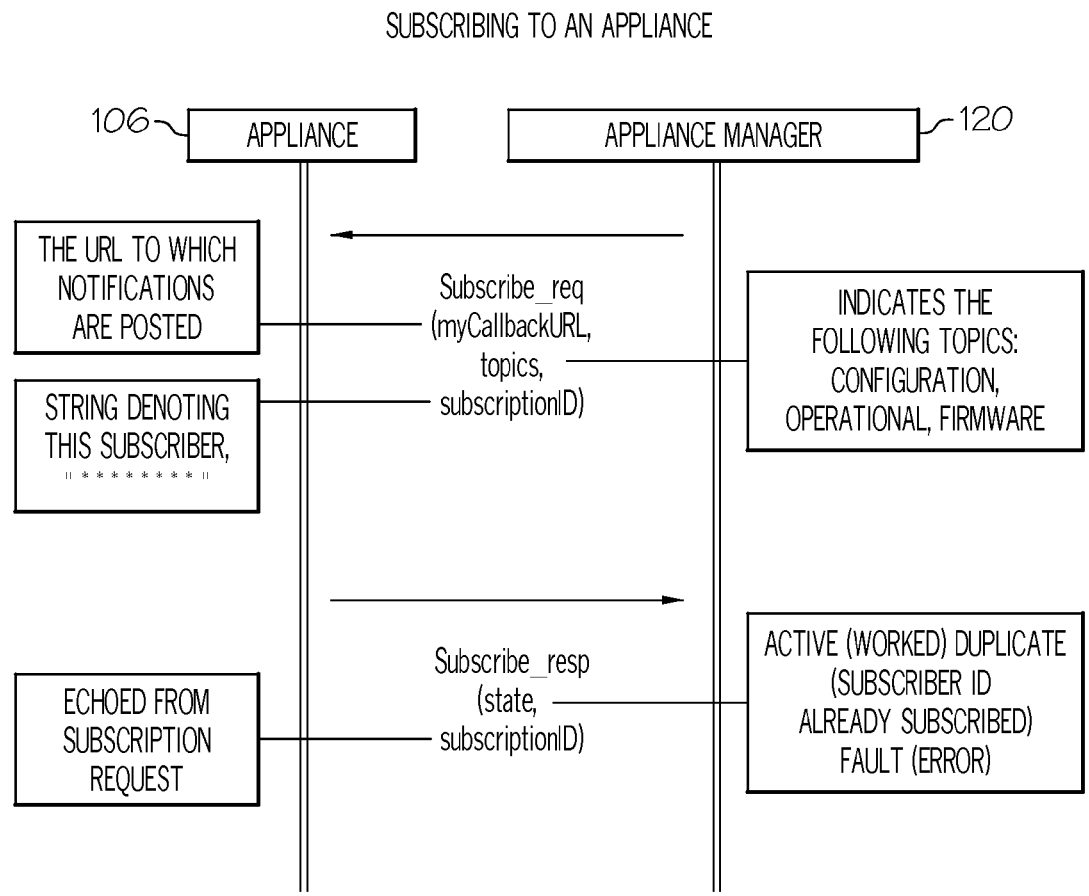
FIG. 9 is a flow chart illustrating an exemplary procedure for an appliance manager to subscribe to an appliance device according to an aspect of the present invention.

Referring to FIG. 9, a flow is illustrated to describe an exemplary exchange between an appliance manager 120 and an appliance 106. The illustrated exchange allows the appliance manager to identify an appliance 106 as a "subscribed-to" appliance, that is, the appliance manager 120 is subscribed to operation and configuration events of the appliance 106. The subscription operation may be performed, for example, at the start-up of the appliance manager 120 or when an appliance 106 is added to the appliance manager 120. As noted above, the subscription process identifies to the appliance manager 120, those appliances 106 that are available to be managed. In the illustrative example, the appliance manager 120 issues a subscribe request to the corresponding appliance 106.

The subscribe request may include, for example an address such as a URL of the appliance manager 120, designated "myCallbackURL" in FIG. 9. The URL included with the subscribe request message may be used by the appliance 106 to post all events back to the appliance manager 120, such as via HTTP messages or other suitable method of communication. The subscribe request may also include any topics field(s), which may be used to distinguish a topic of an exchange. For example, the topics field may be used to differentiate exchanges related to configuration information, operational information, firmware information etc. As another example, the subscribe request may include a subscription ID or other string to denote an identifier for the subscribing appliance.

The appliance 106 may respond with a subscribe response message which may include a state field. The state field may be used to indicate a state of the appliance 106, such as active, duplicate, an indication that the subscriber ID is already subscribed, or a fault/error code. For example, according to an aspect of the present invention, the request can fail or succeed with two different return codes. In the normal case where this is a new subscription, the appliance 106 may return an active code. In this regard, the code "Active" indicates that the appliance 106 is active and has agreed to subscribe to the appliance manager 120. However, there may be cases where the appliance manager 120 has bounced after it has subscribed. In this case, "duplicate" is returned as the state value enabling the appliance manager 120 to understand that a synchronization operation is required. Alternatively, if an error occurs, a fault error code may be returned. A fault can occur, for example, if an appliance manager instance is already subscribed to a given appliance.

Figure 10:
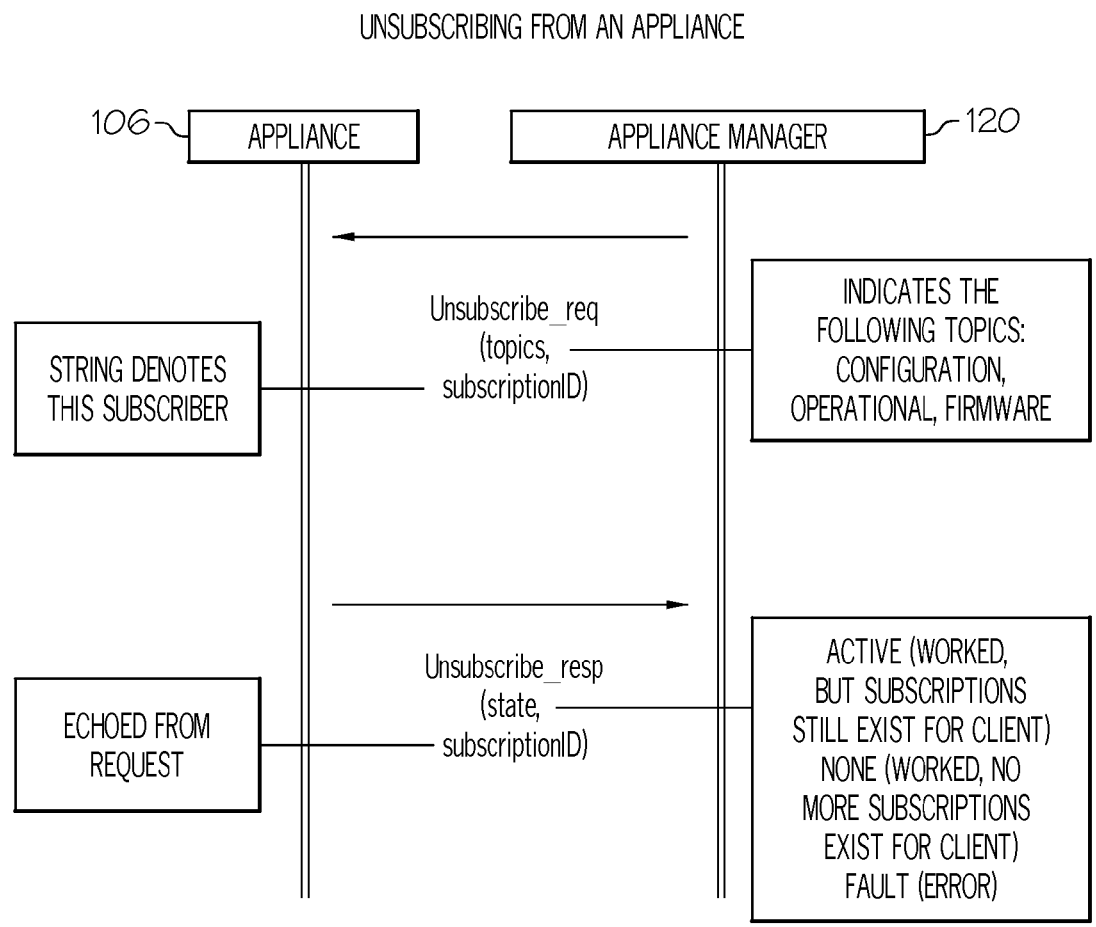
FIG. 10 is a flow chart illustrating an exemplary procedure for an appliance manager to unsubscribe to an appliance device according to an aspect of the present invention.

Referring to FIG. 10, a flow is illustrated to describe an exemplary exchange between an appliance manager 120 and an appliance 106 to unsubscribe an appliance 106 to a corresponding appliance manager 120. The appliance manager 120 submits an unsubscribe requests to an appliance 106. The unsubscribe request may include a field such as a topic field which indicates a topic of the exchange as described with reference to FIG. 9. The unsubscribe request may also include a subscription ID, such as a string which denotes an identifier of the subscriber appliance which was generated as part of a corresponding subscription request. The appliance 106 responds with an unsubscribe response message which may include a state field that describes the status of the unsubscribe request.

For example a state value of "active" may be used to indicate that the unsubscribe request worked, i.e., the operation to unsubscribe has been successfully implemented, but subscriptions still exist for the appliance manager 120. The state value of "none" may be used, for example, to indicate the unsubscribe operation worked and there are no more subscriptions between the appliance 106 and appliance manager 120. Still further, a "fault" value may be used to designate an error condition. The appliance 106 may also echo its subscription ID or identifier back to the appliance manager 120.

Figure 11:
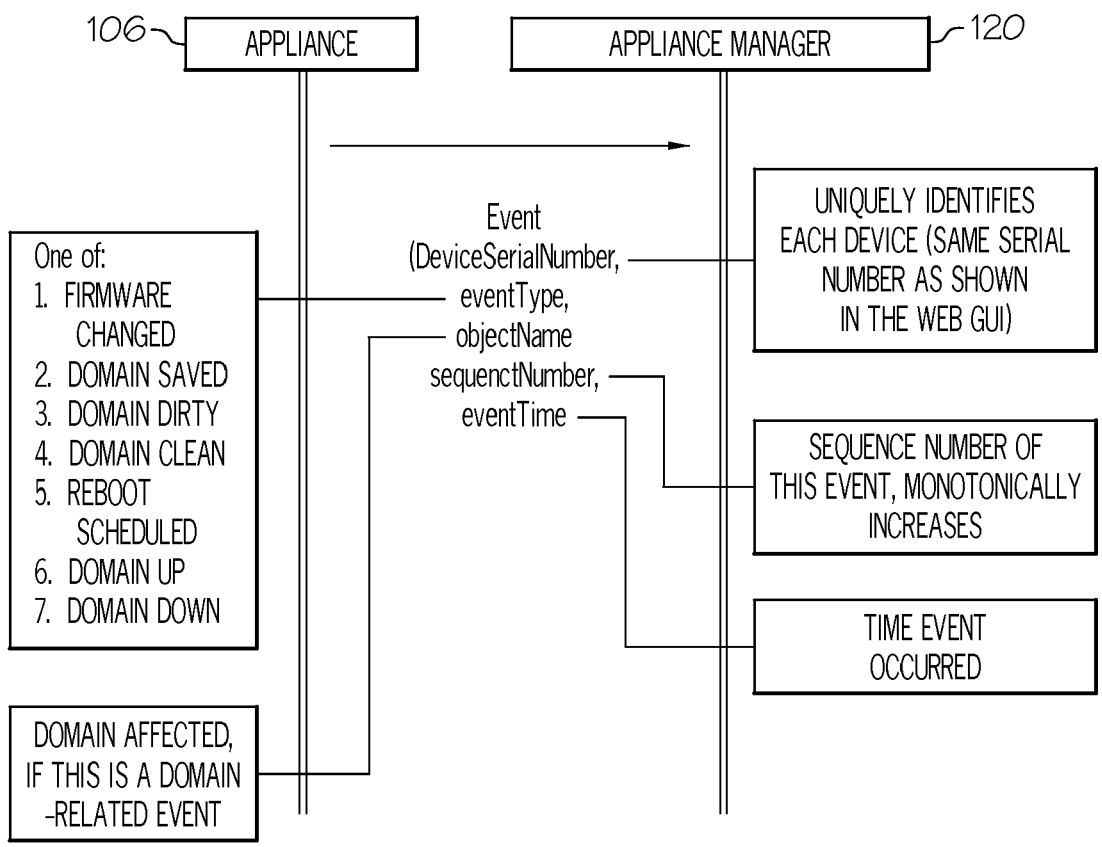
FIG. 11 is a flow chart illustrating an exemplary procedure for an appliance manager to exchange information based upon events generated by an appliance device according to an aspect of the present invention.

Referring to FIG. 11, once a subscription has been established between an appliance 106 and a corresponding appliance manager 120, the appliance 106 may transmit events to the appliance manager 120, e.g., when activities are performed at the appliance 106 concerning configuration and operational situations. Each event message may include a device serial number that uniquely identifies each device. As an example, the serial number utilized to identify the appliance 106 as shown in a corresponding appliance interface such as a Web GUI may be provided as part of the event message.

The event message may also include an event type. As shown in the exemplary message exchange, seven representative event types are listed, including a firmware change event type, which may be used to communicate to the application manager 120 that the firmware of the appliance has been modified. Under this arrangement, the appliance manager 120 may archive, synchronize etc., the firmware across all appliances 106 in a corresponding managed set, e.g., where the firmware change was implemented on a master appliance. Another exemplary event type comprises detecting that a domain has been saved. For example, a user may utilize a standard configuration mechanism of the appliance 106, e.g., a command line or GUI to change the service domain configuration of the appliance 106. The save operation triggers the appliance 106 to send an event message to the appliance manager 120, which may trigger archiving, synchronization, etc. as set out more fully herein. Still further event message types may include a status that a domain is dirty, a domain is clean, that a reboot of the appliance is scheduled, that a domain is up or that a domain is down. Again, the application manager 120 takes appropriate actions based upon the event as set out in greater detail herein.

If an event message is generated in response to the change of a specific domain, then that domain may be identified in the event message. Still further, the event message may include for example, a monotonically increasing sequence number that may be used in conjunction with heart beating or other similar techniques to determine if any of the events have been lost. An exemplary heart beating operation is described in greater detail below. Such a technique may ensure that the appliance manager 120 always has an accurate view of each appliance's configuration. Each event message may also include a timestamp of the event.

Figure 12:
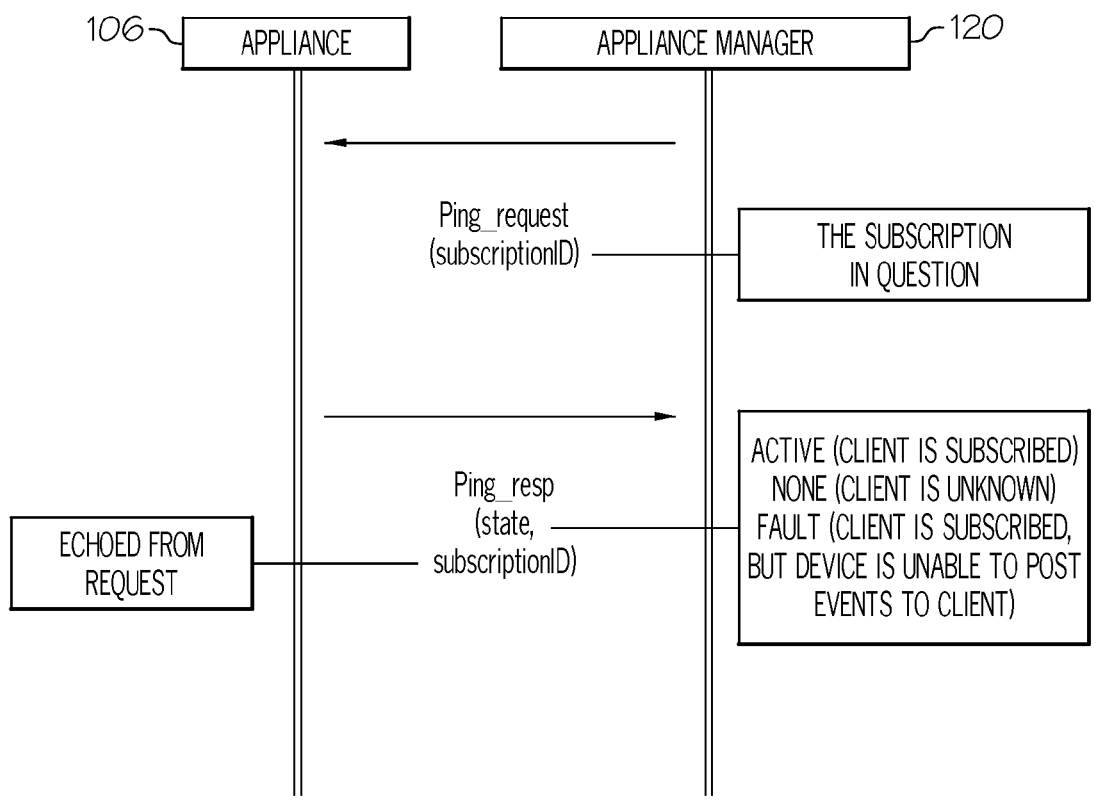
FIG. 12 is a flow chart illustrating an exemplary procedure for an appliance manager to ensure that an appliance device is active using a heartbeat approach according to an aspect of the present invention.

Referring to FIG. 12, the appliance manager 120 may use "heartbeats" to periodically determine the health and status of its associated managed appliances 106. The heartbeat response includes return codes similar to subscribe requests such as described with reference to FIG. 10. In the normal case, an active code is returned implying that the appliance 106 is performing normally. In the event of a known subscription which is experiencing connectivity problems during an event posting such as where a mis-configuration of DMZ policies has occurred, a fault code is returned. A fault code signals to the appliance manager 120 that user intervention is likely required. A return of "none" indicates that the subscription is unknown. According to an aspect of the invention, it is assumed that appliances 106 are by and large stateless across reboots. The scenario may occur if the appliance 106 was restarted. Detecting this condition ensures that no events have been missed.

The appliance manager 120 may then, in turn, initiate a synchronize operation. For example as shown in FIG. 12, the appliance manager 120 implements a ping request to an appliance. The ping request may include a field such as the subscription ID as described with reference to FIG. 9. The appliance 106 returns a ping response. The ping response may include fields such as a state field as described in greater detail herein. For example, the state field may have a value of "active" to designate that the appliance manager 120 is subscribed to the appliance 106, a value of "none" if the appliance manager 120 is unknown to the appliance 106 or a value of "fault" where the appliance manager 120 is subscribed, but the appliance 106 is unable to post events to the appliance manager 120. The ping response also echoes the subscription ID back to the appliance manager 120.

Figure 13:
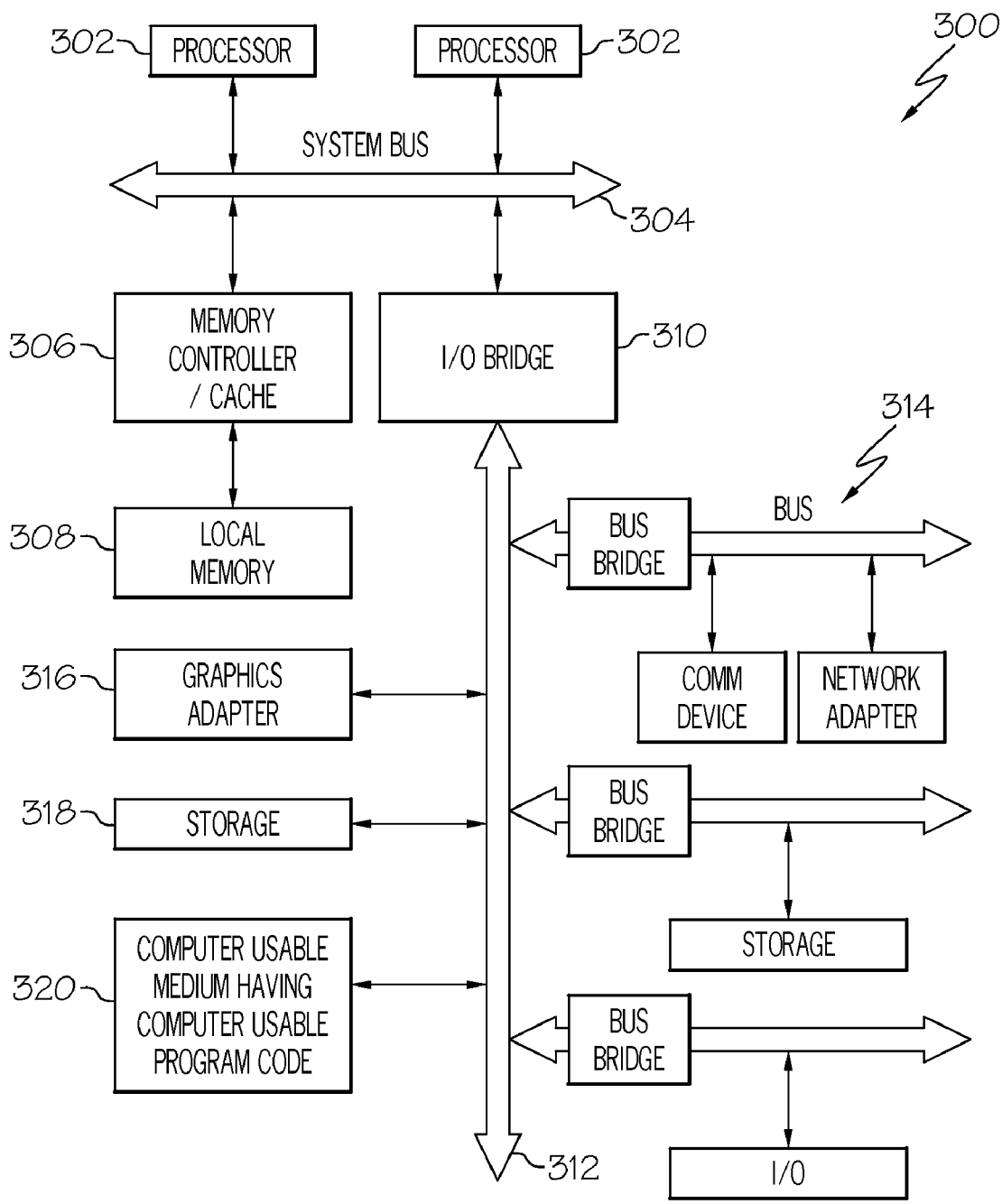
FIG. 13 is a block diagram of an exemplary computer system including a computer usable medium having computer usable program code embodied therewith, where the exemplary computer system is capable of executing a computer program product to manage appliances in a networked environment according to various aspects of the present invention.

Referring to FIG. 13, a block diagram of a data processing system is depicted in accordance with the present invention. Data processing system 300 may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bus bridge 310 is connected to the system bus 304 and provides an interface to an I/O bus 312. The I/O bus may be utilized to support one or more busses and corresponding devices 314, such as bus bridges, input output devices (I/O devices), storage, network adapters, etc.

Also connected to the I/O bus may be devices such as a graphics adapter 316, storage 318 and a computer usable medium 320 having computer usable program code embodied thereon. The computer usable program code may be utilized, for example, to implement the method 150 of FIG. 6, the appliance manager 120 of FIGS. 2-5, the communication exchanges between the appliances 106 and the appliance manager 120 as illustrated in FIGS. 9-12 and/or any other various aspects of the present invention. The data processing system depicted in FIG. 13 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will become apparent that modifications and variations are possible without departing from the scope of the invention defined in the appended claims.

What is claimed is:

1. A management protocol system to manage opaque entities in a computing environment comprising:
    a processor;
    an events component that is configured on the processor, when executed, to enable a manager to utilize a received event communicated by a corresponding managed entity of a plurality of managed entities, to indicate when administration or other management actions have occurred to domain information on said corresponding managed entity; and
    a commands component that is configured, when executed, to interact with select ones of said plurality of managed entities in response to said events component receiving corresponding events there from so that said manager can manage said plurality of managed entities as opaque entities, said commands component having:
    a backup command to back up said domain information stored by said managed entities as opaque configuration objects;
    a restore command to restore said domain information to said managed entities as opaque configuration objects; and
    a query command to query, an identified one of said plurality of managed entities to determine whether two domain configurations are semantically different in a way that allows the configurations to remain opaque to said manager;
    wherein a service level domain is defined as a type of domain information that characterizes configuration information specific to an entity to be managed, and said commands component further comprises an operation to version changes to managed entities that:
    requests a copy of a current service level domain from a particular managed entity in response to receiving an event there from indicating that a potential service level domain change has occurred;
    retrieves a previously stored service level domain corresponding to said particular managed entity;
    transmits said stored service level domain to said particular managed entity;
    receives a message from said particular managed entity indicating results of a comparison of said current service level domain and said stored service level domain; and
    stores version information including said copy of said current service level domain based upon results of the comparison indicated in said message from said particular managed entity.

2. The management protocol system according to claim 1, wherein said events component, when executed, receives events as data-less indications that changes occurred on corresponding managed entities without providing the content of the change.

3. The management protocol system according to claim 1, wherein said events component, when executed, receives events that indicate changes to corresponding managed entities in categories related to firmware, domain information and domain status.

4. The management protocol system according to claim 1, wherein said commands component further comprises a command to selectively upgrade or downgrade the firmware of select managed entities.

5. The management protocol system according to claim 1, further comprising:
    a command that implements a subscription operation to identify managed entities that:
    issues a subscribe request to a select entity to be managed that includes an address for said select entity to be managed to send events to said manager;
    receives a subscribe response from said select entity to be managed; and
    identifies said select entity to be managed as a select one of said managed entities if said subscribe response returned to said manager indicates acceptance of being managed.

6. The management protocol system according to claim 1, further comprising:
    a command that implements a heartbeat as a ping request to periodically determine the health and status of managed entities that receives a return code from managed entities indicating that a corresponding managed entity is active or that a fault has occurred.

7. A method of enabling management of opaque entities in a computing environment comprising:
    providing an events component that is configured on a processor, when executed, to enable a manager to utilize a received event communicated by a corresponding managed entity of a plurality of managed entities, to indicate when administration or other management actions have occurred to domain information on said corresponding managed entity; and
    providing a commands component that is configured, when executed, to interact with select ones of said plurality of managed entities in response to said events component receiving corresponding events there from so that said manager can manage said plurality of managed entities as opaque entities, said commands component having commands for:
    backing up said domain information stored by said managed entities as opaque configuration objects;
    restoring said domain information to said managed entities as opaque configuration objects; and
    querying an identified one of said plurality of managed entities to determine whether two domain configurations are semantically different in a way that allows the configurations to remain opaque to said manager;
    wherein said providing a commands component further comprises providing operations to version changes to managed entities by:
    defining a service level domain as a type of domain information that characterizes configuration information specific to an entity to be managed;
    requesting a copy of a current service level domain from a particular managed entity in response to receiving an event there from indicating that a potential service level domain change has occurred;
    retrieving a previously stored service level domain corresponding to said particular managed entity;
    transmitting said stored service level domain to said particular managed entity;

receiving a message from said particular managed entity indicating results of a comparison of said current service level domain and said stored service level domain; and storing version information including said copy of said current service level domain based upon results of the comparison indicated in said message from said particular managed entity.

8. The method according to claim 7, wherein said providing an events component comprises:

providing said events component that is configured, when executed, to receive events as data-less indications that changes occurred on corresponding managed entities without providing the content of the change.

9. The method according to claim 7, wherein said providing an events component comprises:

providing said events component that is configured, when executed, to receive events that indicate changes to corresponding managed entities in categories related to firmware, domain information and domain status.

10. The method according to claim 7, wherein said providing a commands component further comprises providing a command to selectively upgrade or downgrade the firmware of select managed entities.

11. The method according to claim 7, further comprising:

implementing a subscription operation to identify managed entities comprising:

issuing a subscribe request to a select entity to be managed that includes an address for said select entity to be managed to send events to said manager;

receiving a subscribe response from said select entity to be managed; and identifying said select entity to be managed as a select one of said managed entities if said subscribe response returned to said manager indicates acceptance of being managed.

12. The method according to claim 7, further comprising:

transmitting a heartbeat as a ping request to periodically determine the health and status of managed entities;

receiving a return code from managed entities indicating that a corresponding managed entity is active or that a fault has occurred.

13. A computer program product that provides a protocol to manage opaque entities in a computing environment comprising:

a computer usable storage medium having computer usable program code embodied therewith, the computer usable program code comprising:

computer usable program code configured to implement an events component that is configured, when executed, to enable a manager to utilize a received event communicated by a corresponding managed entity of a plurality of managed entities, to indicate when administration or other management actions have occurred to domain information on said corresponding managed entity; and computer usable program code configured to implement a commands component that is configured, when executed, to interact with select ones of said plurality of managed entities in response to said events component receiving corresponding events there from so that said manager can manage said plurality of managed entities as opaque entities, said commands comprising:

computer usable program code configured to implement a backup command to back up said domain information stored by said managed entities as opaque configuration objects;

computer usable program code configured to implement a restore command to restore said domain information to said managed entities as opaque configuration objects; and computer usable program code configured to implement a query command to query an identified one of said plurality of managed entities to determine whether two domain configurations are semantically different in a way that allows the configurations to remain opaque to said manager;

wherein said computer usable program code configured to implement a commands component, when executed, further comprises operations to version changes to managed entities by providing computer usable program code that:

defines a service level domain as a type of domain information that characterizes configuration information specific to an entity to be managed;

requests a copy of a current service level domain from a particular managed entity in response to receiving an event there from indicating that a potential service level domain change has occurred;

retrieves a previously stored service level domain corresponding to said particular managed entity;

transmits said stored service level domain to said particular managed entity;

receiving a message from said particular managed entity indicating results of a comparison of said current service level domain and said stored service level domain; and stores version information including said copy of said current service level domain based upon results of the comparison indicated in said message from said particular managed entity.

14. The computer program product according to claim 13, wherein said computer usable program code configured to implement an events component, when executed, receives events as data-less indications that changes occurred on corresponding managed entities without providing the content of the change.

15. The computer program product according to claim 13, wherein said computer usable program code configured to implement an events component, when executed, receives events that indicate changes to corresponding managed entities in categories related to firmware, domain information and domain status.

16. The computer program product according to claim 13, wherein said computer usable program code configured to implement a commands component, when executed, further comprises computer usable program code configured to selectively upgrade or downgrade the firmware of select managed entities.

17. The computer program product according to claim 13, further comprising:

computer usable program code configured to implement a subscription operation to identify managed entities that:

issues a subscribe request to a select entity to be managed that includes an address for said select entity to be managed to send events to said manager;

receives a subscribe response from said select entity to be managed; and identifies said select entity to be managed as a select one of said managed entities if said subscribe response returned to said manager indicates acceptance of being managed.

18. The computer program product according to claim 13, further comprising:
   computer usable program code configured to implement a heartbeat as a ping request to periodically determine the health and status of managed entities that receives a return code from managed entities indicating that a corresponding managed entity is active or that a fault has occurred.

* * * * *